United States Patent
Moore

[11] 3,900,616
[45] Aug. 19, 1975

[54] PROCESS FOR COATING A NONPOROUS SUBSTRATE WITH A VINYLIDENE CHLORIDE POLYMER USING A THERMOPLASTIC POLYURETHANE PRECOAT

[75] Inventor: Carl Moore, Midland, Mich.

[73] Assignee: The Dow Chemical Company, Midland, Mich.

[22] Filed: Oct. 20, 1972

[21] Appl. No.: 299,237

[52] U.S. Cl. ............ 427/385; 427/407; 428/424
[51] Int. Cl. .................................. B44d 1/16
[58] Field of Search......... 117/47 R, 47 A, 49, 62.1, 117/62.2, 75, 76 F, 76 T, 138.8 E; 161/190

[56] References Cited
UNITED STATES PATENTS

| | | | |
|---|---|---|---|
| 2,430,479 | 11/1947 | Pratt et al. | 117/60 X |
| 2,968,575 | 1/1961 | Mallonee | 161/190 X |
| 3,158,494 | 11/1964 | Eikvar et al. | 117/76 X |
| 3,218,215 | 11/1965 | Achterhof et al. | 156/321 |
| 3,552,998 | 1/1971 | Wegna et al. | 117/76 |

Primary Examiner—Michael R. Lusignan
Attorney, Agent, or Firm—Ronald G. Brookens

[57] ABSTRACT

A process for coating a nonporous substrate with a vinylidene chloride polymer latex using a thermoplastic polyester-type polyurethane precoat wherein the polyurethane has the formula

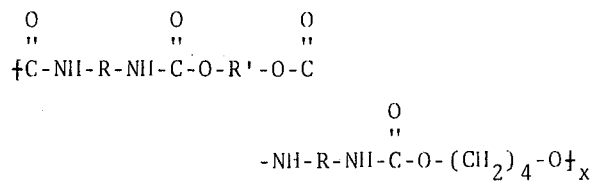

where R is

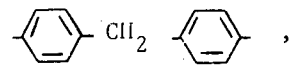

where R' is

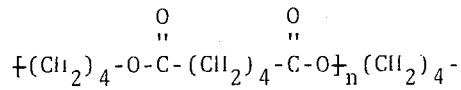

where $n$ is an integer from 1 to 10, and where $x$ is an integer of from about 13 to 40.

3 Claims, No Drawings

PROCESS FOR COATING A NONPOROUS SUBSTRATE WITH A VINYLIDENE CHLORIDE POLYMER USING A THERMOPLASTIC POLYURETHANE PRECOAT

BACKGROUND

Nonporous substrates such as sheets and films of polyolefins, nylon, polyester and metal foil are used widely in the packaging field. For some purposes many of these materials exhibit an unacceptable permeability to gases, such as oxygen, nitrogen and carbon dioxide and other volatile materials. Furthermore, many of these materials are susceptible to attack by acids, oils and fats. It is recognized that the permeability of such substrates and their susceptibility to attack by various materials, may be greatly reduced by application thereto of a protective film or coating of a vinylidene chloride polymer.

The vinylidene chloride polymers can be coated onto the aforementioned substrate surfaces either from a solvent solution or from an aqueous dispersion. The disadvantages inherent in coating from solvent solution are that an expensive organic solvent is required which may be toxic and flammable. These disadvantages are avoided by coating from aqueous dispersions. However, it is well recognized in the art that vinylidene chloride polymers deposited from aqueous dispersion are not sufficiently adherent to nonporous substrates to provide acceptable packaging materials. At present, emulsions of vinylidene chloride polymer coatings require the use of an auxiliary adhesion promoter, called a primer or precoat, to develop a level of adhesion to nonporous substrates which will be suitable for packaging purposes.

Although some polymer latexes are used as primers, including certain polyurethane latexes as disclosed in U.S. Pat. No. 3,552,998, they have failed to provide for optimum adhesive properties.

SUMMARY OF THE INVENTION

According to the present invention, it has been found that the use of certain thermoplastic polyester type polyurethanes as a precoat layer, interposed between a nonporous substrate such as a plastic film or metal foil with a heat sealable vinylidene chloride polymer coating thereon, greatly improves adhesion and provides a packaging material having excellent barrier against vapor, gases, oils, fats and acids. In a further embodiment of this invention, it has been discovered that optimum adhesion, at temperatures normally used to heat seal the vinylidene chloride polymer coatings, are achieved by chemical or irradiation induced cross-linking of the prescribed polyurethane precoat.

DESCRIPTION OF THE PREFERRED EMBODIMENTS

The substrate to be coated may be any nonporous film or sheet or other substrate. The improvement comprising the present invention is particularly applicable, however, to the coating of polyolefin film substrates and particularly those films which have been treated, as for example by corona discharge, to yield a surface having a contact angle with water of from about 50° to 75°.

The polyurethanes used as the precoat are selected from those of the formula

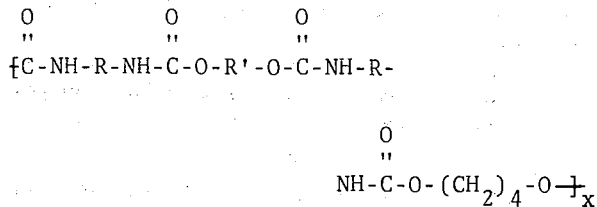

where R is

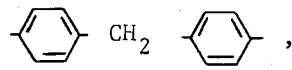

where R' is

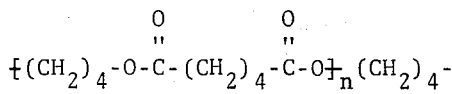

where $n$ is an integer of from 1 to 10, and where $x$ is an integer of from about 13 to 40.

These materials are linear, thermoplastic polymers which are free of isocyanate groups and have molecular weights low enough to permit solubilization in, and application as coatings from, volatile organic solvents. It is to be understood, however, that such polyurethanes may also be coextruded in laminate form with the substrate.

When applying the polyurethane to the substrate from solution, about 3 to 7 percent by weight of polymer solids are dissolved in a suitable solvent, e.g., methylene chloride, tetrahydrofuran, dioxane and ethylene dichloride, among others, and applied to the substrate as a thin coating, e.g., as coating weights as low as about 0.5 gram of coating per 1,000 square inches of substrate surface. The coating is then dried, e.g., by infrared means, for a period of from about 30 to 120 seconds at a temperature below that which fuses or warps the substrate. Where cross-linking is desired to reduce the thermoplasticity of the polyurethane coating, conventional means including high energy irradiation, such as the application of $\beta$ rays using a dosage of approximately 0.5 to 3 megarads, or chemical means can be employed. When chemical cross-linking is desired a reagent such as, e.g., a methoxylated melamine, urea-formaldehyde or other aminoplast resin is added to the polymer solution, before coating of the substrate, along with a small amount of an acidic catalyst, e.g., p-toluene sulfonic acid. The cross-linking reagent is generally used at a 4 to 10 percent level based on the weight of polyurethane. The acidic catalyst is generally used in an amount of from about 0.05 to 0.1 percent based on the weight of polyurethane. In any event, the polyurethane should be cross-linked sufficiently to cause said polyurethane to remain in generally non-flowable form at temperatures up to about 100°C.

The vinylidene chloride polymers used as the barrier coating may be any such polymer containing predominant amounts of vinylidene chloride, e.g., as described in U.S. Pat. No. 3,353,992, issued Nov. 21, 1967. Such barrier coatings are conveniently applied as polymeric aqueous dispersions, e.g., using a No. 6 wire wound rod, and infrared dried for a period of from about 30 to 120 seconds at a temperature sufficient to remove the water from the coating. The barrier coating may be applied as a single or multiple coat system and may be formulated to achieve desired slip and anti-blocking properties.

The invention is further illustrated by the following nonlimiting examples wherein all parts and percentages are by weight unless otherwise indicated.

EXAMPLE 1

In each of a series of experiments, to the surface of individual portions of a 125 gauge polypropylene film, such surfaces having a contact angle with water of approximately 60°, was added a precoat comprising about 0.45 gram per 1,000 square inches of substrate surface of a thermoplastic, polyester-type polyurethane prepared from 4,4'-diphenylmethane diisocyanate, adipic acid, and 1,4-butanediol and having an average molecular weight of about 36,000. The structure of such polyurethane is as follows:

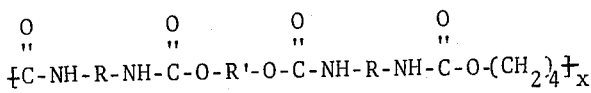

where R is

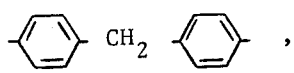

and
where R' is

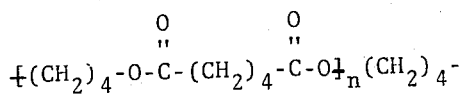

The above polyurethane was applied in the form of a 3 to 5 percent solution in methylene chloride. To several of such solutions was additionally added about 5 percent based on polyurethane of a methoxylated melamine and in some instances additionally from about 0.05 percent of p-toluene sulfonic acid as a chemical curing reagent. After drying of the precoat to remove the methylene chloride, there was applied thereto a vinylidene chloride polymer barrier coating comprised of about 85 parts by weight vinylidene chloride, 13 parts by weight acrylonitrile, and 2 parts by weight of 2-ethylhexyl acrylate, such latex having a solids content of about 50 percent. The latex was formulated by the addition thereto of about 0.5 part of sodium oleate, about 0.75 part of a nonionic emulsifier, about 3 parts of a wax emulsion and about 0.6 part of talc, based on 100 parts of latex solids. This dispersion was then coated on the dried precoat using a number 6 wire wound rod and infrared dried to remove the water therefrom. Each film sample was then separately tested for hot tack adhesion, measured in grams per inch at 135°C., and heat seal strength at 50% and 100% relative humidity. Identification of the samples used and the testing results obtained are given in the following Table I.

Table I

| Sample No. | Precoat Composition | Hot Track at 135°C. (g./in.) | Heat Seal Strength (g./in. after 2 days) | |
|---|---|---|---|---|
| | | | 50% R.H. (Yield) | 100% R.H. (Yield) |
| 1 | None | 26 | 268 | 64 |
| 2 | Polyurethane | 33 | 325 | 322 |
| 3 | Polyurethane + Cross-linking Reagent | 26 | 310 | 312 |
| 4 | Polyurethane + Cross-linking Reagent + Acidic Catalyst | 81 | 649 | 493 |

EXAMPLE 2

In each of a series of additional experiments, individual film samples were prepared as described in Example 1 except that the substrate used was a 2 mil thick polyethylene film the surface of which had a contact angle to water of about 60 degrees. Additionally, some of the primer coatings were cross-linked using β rays (1 to 3 megarads dosage). The following Table II identifies the samples used and the test results obtained.

Table II

| Sample No. | Precoat Composition | Hot Tack at 102°C. (g./in.) | Heat Seal Strength (g./in. after 2 days) | |
|---|---|---|---|---|
| | | | 50% R.H. (Yield) | 100% R.H. (Yield) |
| 5 | None | 81 | 172 | 50 |
| 6 | Polyurethane | 116 | 362 | 252 |
| 7 | Polyurethane + Cross-linking Reagent | 116 | 401 | 162 |
| 8 | Polyurethane + Cross-linking Reagent + Acidic Catalyst | 116 | 762 | 455 |

Table II—Continued

| Sample No. | Precoat Composition | Hot Tack at 102°C. (g./in.) | Heat Seal Strength (g./in. after 2 days) | |
|---|---|---|---|---|
| | | | 50% R.H. (Yield) | 100% R.H. (Yield) |
| 9 | Polyurethane + (1 Megarad Dose) | 137 | 476 | 500 |
| 10 | Polyurethane + (3 Megarad Doses) | 116 | 346 | 314 |

All of the above film samples were smooth, sparkling clear and displayed no blocking tendencies from room temperature to 60°C., and had a low coefficient of friction (0.2 to 0.25).

By way of comparison, substitution of the described thermoplastic polyurethane by one of several commercially available water-soluble polyurethanes and polyurethane latexes provided no evidence of enhancement of adhesion of the vinylidene chloride polymer barrier layers to the nonporous substrate surfaces and, in addition, resulted in unacceptable film forming ability and film clarity. Apparently soaps and toluene used in the manufacture of such materials adversely affect their adhesive properties. Further, such materials may be of a molecular weight which limits their thermoplasticity and hence their ability to form a well-knitted film at the coating temperatures conventionally used. Blends of the herein described vinylidene chloride polymer latexes with such watersoluble polyurethanes also lacked clarity when dried as coatings. Further, scotch tape readily separated such coating from a polyolefin substrate surface.

What is claimed is:

1. In the process of coating a substantially nonporous substrate having a contact angle to water of from about 50° to 75°C. with a vinylidene chloride polymer latex while using a polyurethane precoat wherein said nonporous substrate is first coated with said polyurethane followed by application of an overcoating of said vinylidene chloride polymer latex and drying of said overcoating, the improvement consisting of utilizing as said precoat the dried residue of a coating consisting essentially of a thermoplastic polyester type polyurethane having the formula

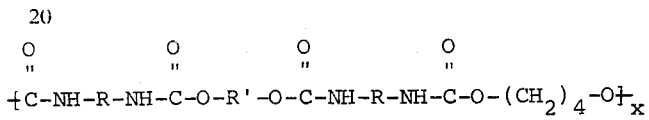

where R is

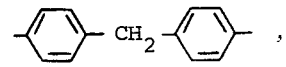

where R' is

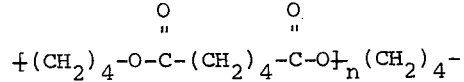

where $n$ is an integer of from 1 to 10, and where $x$ is an integer of from about 13 to 40, dissolved in an organic solvent therefore.

2. The process of claim 1 wherein said substrate is a polyolefin.

3. The process of claim 1 wherein said polyurethane is cross-linked sufficiently following application to said substrate and prior to application of said overcoating to cause said polyurethane to remain in generally nonflowable form at temperatures up to about 100°C.

* * * * *